(12) United States Patent
Potter et al.

(10) Patent No.: US 11,498,817 B2
(45) Date of Patent: Nov. 15, 2022

(54) NUT GAP MONITORING SYSTEM

(71) Applicant: Nabholz Construction Corporation, Conway, AR (US)

(72) Inventors: Mark Raymond Potter, Stratford, CT (US); Stephen Harold Schumacher, Sandy Hook, CT (US)

(73) Assignee: NABHOLZ CONSTRUCTION CORPORATION

( * ) Notice: Subject to any disclaimer, the term of this patent is extended or adjusted under 35 U.S.C. 154(b) by 0 days.

(21) Appl. No.: 16/459,786

(22) Filed: Jul. 2, 2019

(65) Prior Publication Data
US 2021/0002110 A1 Jan. 7, 2021

(51) Int. Cl.
*F16H 25/24* (2006.01)
*B66F 7/02* (2006.01)
*H01H 3/16* (2006.01)

(52) U.S. Cl.
CPC ......... *B66F 7/025* (2013.01); *F16H 25/2472* (2013.01); *B66F 2700/04* (2013.01); *H01H 3/16* (2013.01); *Y10T 74/173* (2015.01); *Y10T 74/18688* (2015.01)

(58) Field of Classification Search
CPC .......... F16H 25/2472; Y10T 74/18688; Y10T 74/18704; Y10T 74/173; E05D 13/003; H01H 3/16; B66F 7/025; B66F 2700/04; B66F 7/20
USPC .......................................... 200/47; 74/89.37
See application file for complete search history.

(56) References Cited

U.S. PATENT DOCUMENTS

| | | |
|---|---|---|
| 1,319,833 A | 10/1919 | Bingaman |
| 1,450,702 A | 4/1923 | Otis |
| 1,564,828 A | 12/1925 | Coffey |
| 1,632,256 A | 6/1927 | Walter |
| 1,707,923 A | 4/1929 | Phelps |
| 1,773,746 A | 8/1930 | Nagell |
| 1,802,592 A | 4/1931 | Christie |
| 1,866,798 A | 7/1932 | Christie |
| 2,097,133 A | 10/1937 | Richardson |
| 2,178,632 A | 11/1939 | Holmes |
| 2,191,710 A | 2/1940 | Fones |

(Continued)

FOREIGN PATENT DOCUMENTS

| | | | |
|---|---|---|---|
| CN | 105293388 A | * | 2/2016 |
| CN | 105293388 A | | 2/2016 |

(Continued)

OTHER PUBLICATIONS

Wilson, Jon S. (2005). Sensor Technology Handbook—15.1.3 Limit Switches. Elsevier. Retrieved from https://app.knovel.com/hotlink/pdf/id:kt0047U307/sensor-technology-handbook/limit-switches (Year: 2005).*

(Continued)

*Primary Examiner* — Mahdi H Nejad
(74) *Attorney, Agent, or Firm* — Hall Estill Law Firm

(57) ABSTRACT

A lifting column can provide optimized performance with a nut gap system that efficiently and precisely measures a nut gap during lifting operations. The nut gap system can have a rotating core onto which a nut and traveler are positioned. The nut can be separated from the traveler by a nut gap that is monitored by at least one sensor that continuously extends through the nut to access the nut gap.

20 Claims, 3 Drawing Sheets

(56) References Cited

U.S. PATENT DOCUMENTS

| | | | |
|---|---|---|---|
| 2,209,378 A * | 7/1940 | Cramer, Jr. | H01H 21/18 |
| | | | 200/47 |
| 2,255,706 A * | 9/1941 | Height | B23Q 16/001 |
| | | | 200/47 |
| 2,655,115 A | 10/1953 | Holdeman et al. | |
| 2,718,851 A | 9/1955 | Holdeman | |
| 3,251,311 A | 5/1966 | Saxonmeyer | |
| 3,370,138 A * | 2/1968 | Vinot | H01H 13/36 |
| | | | 200/47 |
| 4,552,403 A | 11/1985 | Yindra | |
| 6,244,390 B1 | 6/2001 | Yeo et al. | |
| 6,863,159 B2 | 3/2005 | Rauch | |
| 7,198,135 B2 | 4/2007 | Naber | |
| 7,900,562 B2 | 3/2011 | Esposti et al. | |
| 7,954,602 B2 | 6/2011 | Stanislao | |
| 8,028,973 B2 | 10/2011 | Ford et al. | |
| 8,083,034 B2 | 12/2011 | Bordwell et al. | |
| 8,251,184 B2 | 8/2012 | De Jong | |
| 8,286,754 B2 | 10/2012 | Cohn | |
| 8,397,643 B2 | 3/2013 | Esposti et al. | |
| 8,567,761 B2 | 10/2013 | De Jong et al. | |
| 8,919,476 B2 | 12/2014 | Holland et al. | |
| 8,939,296 B2 | 1/2015 | Weyler et al. | |
| 9,045,149 B2 | 6/2015 | Knapp et al. | |
| 9,073,558 B2 | 7/2015 | Knapp et al. | |
| 9,126,607 B2 | 9/2015 | Knapp et al. | |
| 9,193,572 B2 | 11/2015 | Finkbeiner et al. | |
| 9,267,258 B2 | 2/2016 | Knapp et al. | |
| 9,295,324 B2 | 3/2016 | Knapp et al. | |
| 9,758,359 B2 | 9/2017 | Kamphuis et al. | |
| 9,764,933 B2 | 9/2017 | Knapp et al. | |
| 9,764,934 B2 | 9/2017 | Knapp et al. | |
| 9,970,325 B2 | 5/2018 | Oden et al. | |
| 10,000,221 B2 | 6/2018 | Knapp et al. | |
| 2002/0093406 A1 * | 7/2002 | Faber | H03K 17/9505 |
| | | | 335/205 |
| 2006/0107776 A1 | 5/2006 | Minnig et al. | |
| 2008/0197329 A1 | 8/2008 | Brechelente | |
| 2008/0202286 A1 * | 8/2008 | Brechelente | B23Q 5/408 |
| | | | 74/841 |
| 2008/0257080 A1 | 10/2008 | Singh | |
| 2009/0090203 A1 * | 4/2009 | Jones | F16H 25/2454 |
| | | | 74/89.39 |
| 2009/0153278 A1 * | 6/2009 | Shimizu | H01H 13/52 |
| | | | 335/205 |
| 2011/0259429 A1 * | 10/2011 | Whipps | E02B 7/36 |
| | | | 137/1 |
| 2012/0081107 A1 * | 4/2012 | Fitch | G01B 7/023 |
| | | | 324/207.15 |
| 2013/0118836 A1 * | 5/2013 | Rossignol | B66B 1/28 |
| | | | 187/247 |
| 2016/0039646 A1 | 2/2016 | Knapp | |
| 2018/0310848 A1 * | 11/2018 | Tvedt | A61B 5/6885 |

FOREIGN PATENT DOCUMENTS

| | | | |
|---|---|---|---|
| GB | 1251490 | * | 10/1971 |
| JP | 62-041464 A | | 2/1987 |

OTHER PUBLICATIONS

Catalog—InductiveSensor—ENUS (Year: 2016).*
Mounting Conditions for Inductive Proximity Sensors (Pepperi+ Fuchs Blog (posted by David Rubinski on Thu, Jul. 26, 2012)) found at: https://blog.pepperl-fuchs.us/blog/bid/196844/Mounting-Conditions-for-Inductive-Proximity-Sensors (Year: 2012).*
David Rubinski; Found at: https://blog.pepperl-fuchs.us/blog/bid/196844/Mounting-Conditions-for-Inductive-Proximity-Sensors (Year: 2012).*

* cited by examiner

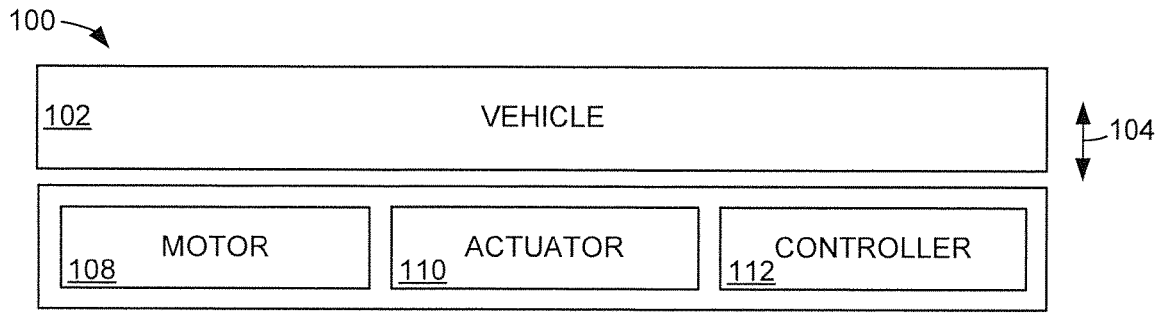
FIG. 1
(Prior Art)
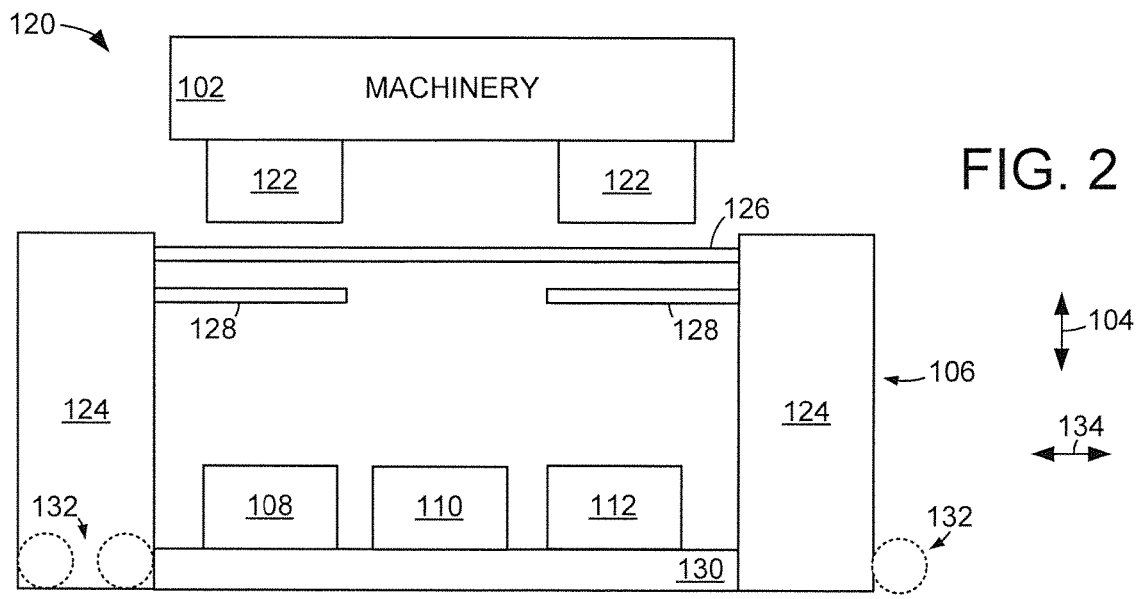
FIG. 2
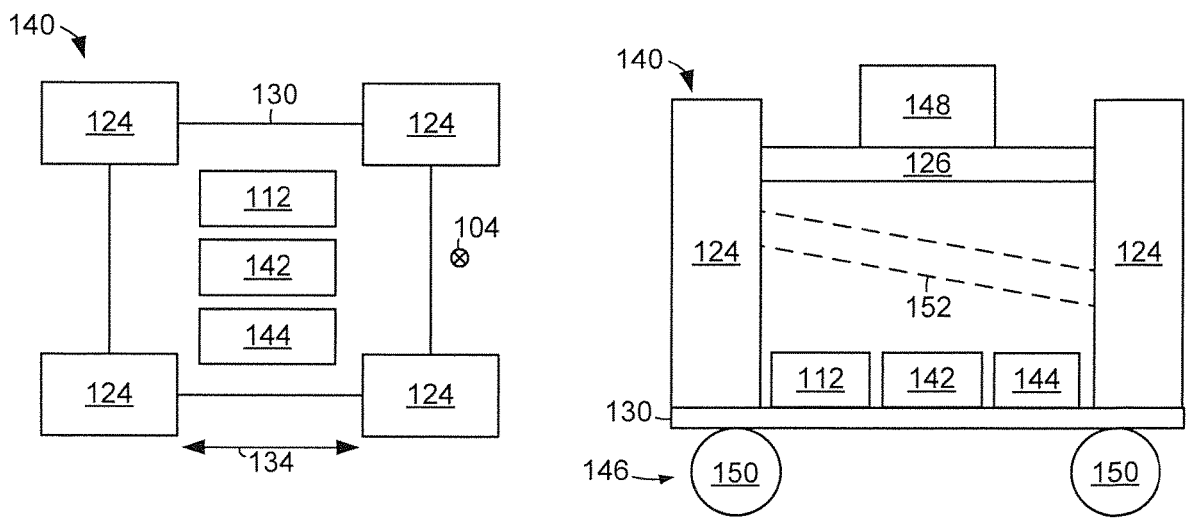
FIG. 3A
FIG. 3B

NUT GAP MONITORING SYSTEM

SUMMARY

In accordance with some embodiments, a rotating core coupled to a nut and traveler. The nut separated from a traveler by a nut gap monitored by at least one sensor continuously extending through the nut.

Other embodiments have a nut and a traveler each positioned on a rotating core. The nut separated from a traveler by a nut gap that is monitored by a first sensor and a second sensor with each sensor continuously extending through the nut.

Operation of a lifting column, in some embodiments, involves positioning a traveler and nut on a core with the nut separated from the traveler by a nut gap. The core is rotated to vertically displace the traveler and nut and a nut gap distance is measured with a sensor that continuously extends through the nut to access the nut gap.

BRIEF DESCRIPTION OF THE DRAWINGS

FIG. 1 is a block representation of an example maintenance system in which various embodiments can be practiced.

FIG. 2 depicts a block representation of an example drop table system arranged in accordance with various embodiments.

FIGS. 3A & 3B represents portions of an example drop table capable of being used in the systems of FIGS. 1 & 2.

DETAILED DESCRIPTION

Figure 4:
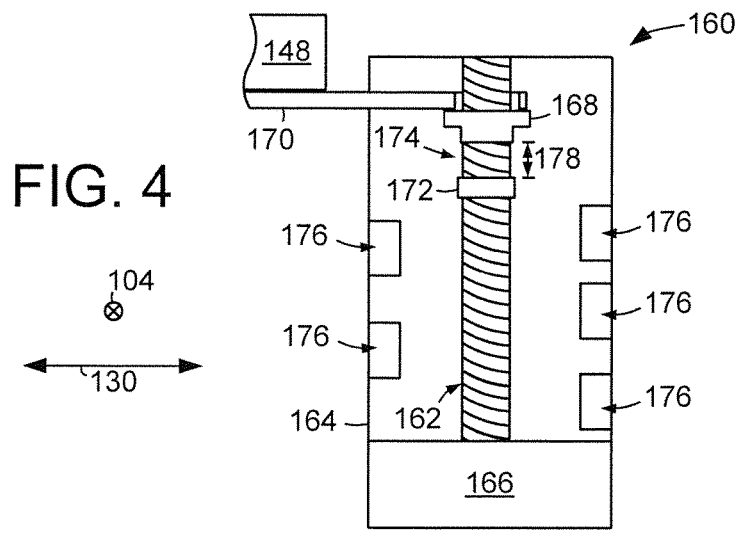
FIG. 4 displays portions of an example lifting column arranged in accordance with assorted embodiments.

Various embodiments of this disclosure generally relate to a moving assembly with operation optimized by a nut gap system that accurately monitors operating parameters.

Advancements in mechanization have provided equipment that are larger, heavier, and more capable than predecessors. The sophistication of machinery can correspond with increased volumes of maintenance that are needed to provide the equipment's capabilities. Some maintenance can involve the lifting, or lowering, of relatively heavy equipment, or components removed from the equipment. Such lifting can be conducted with one or more lifting assemblies that utilize mechanical, hydraulic, and/or pneumatic means to articulate the position of attached equipment.

While the moving assemblies, such as lifting columns, may be capable of safely handling small-scale equipment can be relatively simple, the vertical articulation of heavy machinery, such as equipment weighing one ton or more, can involve complex and/or cumbersome. For example, a drop table capable of raising and lowering vehicle components weighing fifty tons can employ multiple separate lifting assemblies acting in unison. Hence, where heavy loads and/or long vertical distances are to be traversed, lifting assemblies are relied upon for accurate, consistent, and reliable operation in order to protect the load being moved as well as the safety of personnel and equipment nearby.

Accordingly, a moving assembly can be configured in accordance with some embodiments with a nut gap monitoring system that provides precise measurements that convey the quality, accuracy, and reliability of lifting operations. The ability to efficiently monitor the distance between a nut and a traveler in real-time allows a user to discern if operational degradation is occurring, which allows proactive actions to be taken to prevent operational errors and equipment failures.

Turning to the drawings, FIG. 1 depicts a block representation of an example maintenance system 100 in which various embodiments can be practiced. The system 100 can be configured to service any type, and size, of machinery, such as a vehicle 102. It is contemplated that more than one vehicle 102 can concurrently be accessed and serviced, but such arrangement is not required or limiting.

Although assorted maintenance can be facilitated without physically moving the machinery 102, such as engine tuning or joint greasing, other maintenance requires the separation of one or more components from the vehicle 102. Such separation can be conducted either by lifting the machinery 102 while a component remains stationary or by lowering the component while the machinery 102 remains stationary. Due to the significant weight and overall size of some machinery 102, such as a locomotive engine or railcar, the maintenance system 100 is directed to moving a component vertically, as represented by arrow 104, with a lifting mechanism 106 while the remainder of the machinery 102 remains stationary.

The lifting mechanism 106 can consist of at least a motor 108, or engine, that allows one or more actuators 110 to physically engage and move vehicle component. A local controller 112 can direct motor 108 and actuator 110 operation and may be complemented with one or more manual inputs, such as a switch, button, or graphical user interface (GUI), that allow customized movement of the machinery component. The local controller 112 can conduct a predetermined lifting protocol that dictates the assorted forces utilized by the motor 108 and actuator 110 to efficiently and safely conduct vertical component displacement.

In accordance with some embodiments, the lifting mechanism 106 can be characterized as a drop table onto which the machinery 102 moves to position a component in place to enable component removal, and subsequent installation. FIG. 2 depicts a block representation of an example lifting system 120 arranged to provide maintenance operations for machinery 102. A lifting mechanism 106 can consist of one or more motors 108, actuators 110, and controllers 112 that are utilized to engage and secure a machinery component 122, such as a wheel, suspension, engine, or body, throughout a range of vertical motion 104.

Depending on the position and size of the component 122, the lifting mechanism 106 can vertically manipulate the component 122 itself or the machinery 102 as a whole to allow efficient access, removal, and subsequent installation of the component 122 to be serviced. That is, the lifting mechanism 106 can be utilized to separate a component 122 from machinery 102 by keeping the component 122 stationary while vertically moving the rest of the machinery 102 or by keeping the machinery 102 stationary while vertically moving the component 122 by itself.

It is contemplated that the lifting mechanism 106 can consist of one or more lifting columns 124 that operate collectively to vertically displace a component 122. In some embodiments, multiple separate lifting columns 124 each raise a platform 126, as shown in FIG. 2. That is, lifting columns 124 that are physically separated can be concurrently activated to apply force on a platform 126 that physically supports the component 122. Such unified lifting column 124 and platform 126 can provide consistent operation over time as deviations in operating characteristics, such as lifting speed and precision, are mitigated by the platform 126 that physically brings the respective lifting columns 124 into similar operating characteristics. However, the use of a unifying platform 126 can make the lifting mechanism 106 rather large and physically restrictive to machinery 102 and/or components 122 of certain sizes and shapes.

Other embodiments configure the lifting mechanism 106 of multiple separate lifting columns 124 that each contact different portions of a component 122 via independent protrusions 128. The use of independent lifting columns 124 can provide increased physical compatibility with diverse machinery 102 and/or component 122 shapes and sized. In yet, independent lifting columns 124 can be more susceptible to component 124 instability during lifting operations as a result of deviations in operating characteristics for the respective columns 124. Such independent lifting column 124 configuration also suffers from increased complexity compared to using a unifying platform 126 due to the coordination of the respective column's 124 operation to provide secure component 122 movement.

It is contemplated that a lifting column 124 can be secured to a base 130, such as a floor, foundation, or frame. A base 130 can be constructed to be permanently stationary or move upon activation to relocate the collective lifting columns 124. The rigid connection of each lifting column 124 to a base 130 can provide increased strength to the lifting mechanism 106, but can limit the operational flexibility of the system 120. Conversely, the respective lifting columns 124 can have transport assemblies 132, such as a suspension, wheels, or tracks, that allow a column 124 to move relative to a base 130 via manual or automated manipulation.

In accordance with various embodiments, multiple lifting columns 124 can be mounted to a base 130 that can provide vertical 104 and horizontal 134 movement of relatively large loads, such as 50 tons or more. Such lifting column 124 configuration can be generally characterized as a drop table, which is depicted in the lifting system 140 of FIGS. 3A & 3B. The top view of FIG. 3A displays a platform 126 disposed between and physically attached to multiple lifting columns 124. As directed by a local controller 112, one or more lifting motors 142, or engines, can articulate aspects of the respective columns 124 to move the platform 126 in the vertical direction 104. The controller 112 may further direct one or more transverse motors 144, or engines, to activate a drive line 146 and move the platform 126 along the horizontal direction 134.

It is contemplated that one or more lifting columns 124 are physically separated from the platform 126, but such configuration would necessitate individual motors 142/144 for each column 124 along with complex spatial sensing and coordination to ensure a load 148 is securely lifted and moved. Instead, the platform 126 physically unifies the respective lifting columns 124 and provides a foundation onto which the load 148 can rest and provide a consistent center of gravity throughout lifting 104 and horizontal 134 movement activities.

FIG. 3B displays side view and an example physical layout of the lifting system 140 where a base 130 remains stationary while the platform 126 is vertically translated. The base 130 provides a secure foundation for the various motors 142/144 and associated transmission to the respective lifting columns 124. The base 130 further anchors the drive line 146 and number of constituent rollers 150, which can be wheels, castors, trucks, or other assembly utilizing a bearing. During normal operation, the assorted lifting columns 124 provide uniform platform 126 lifting and lowering.

However, the fact that the multiple lifting columns 124 can independently experience failures increases the operational risk of less than all of the columns 124 experiencing an error. When a lifting column 124 experiences a failure while other columns 124 continue to operate, the platform 126 can become unstable, as illustrated by segmented platform 152, and the very heavy load 148 can be at risk of damage and/or damaging the lifting system 140 as well as nearby equipment and users. Hence, the use of independent lifting motors 142, or independent lifting columns 124 separate from a platform 126, can be particularly dangerous. Furthermore, independent lifting columns 124 provide less physical space for motors 142 and limit the available motor size and power that can be safely handled by a column 124, which reduces the efficiency and safety of lifting heavy loads 148 safely, such as over 10 tons.

In contrast to independent lifting columns 124 having independent lifting motors 142, it is contemplated that a single motor can be employed to power the respective columns 124 collectively. While the base 130 could provide enough space and rigidity to handle a single motor/engine 142, the failure rates and operational longevity of a motor/engine 142 capable of lifting a load 128 weighing tens of tons can involve increased service times and frequency that can be prohibitive in terms of lifting system 140 operational efficiency. In addition, it is noted that large parasitic energy losses can be experienced through transmission that translates the power output of a single motor/engine 142 to four separate lifting columns 124.

Accordingly, various embodiments employ a lifting motor 142 to power two separate lifting columns 124 that are unified by a single platform that is vertically manipulated by the collective operation of the lifting columns 124 and dual drive motors 142. The combination of two lifting motors 142 to power four columns 124 provides an enhanced motor efficiency via relatively simple transmissions, lower service times/frequency, and relatively simple motor 142 coordination compared to independent columns 124 or a single motor powering four columns 124.

FIG. 4 depicts portions of an example lifting column 160 configured in accordance with some embodiments to provide efficient and safe lifting operations as part of a lifting system. It is noted that the lifting column 160 may operate alone, or in concert with one or more lifting columns 160 to vertically manipulate a load with, or without, a platform extending between columns 160. Through bidirectional activation of at least one column 160, a physically attached load 148 can have vertical movement 104 safely and reliably with minimal load motion and/or vibration.

The operation and physical configuration of a lifting columns 160 is not limited, but can involve a rotating core 162 positioned within a housing 164 that can be arranged to prevent debris and other interference from altering the translation of mechanical energy from a transmission 166 to a traveler 168 and an attached load 148 via supporting arm 170, or platform. While the traveler 168 can be the lone component that traverses the core 162 in response to core rotation, various embodiments employ one or more safety nuts 172 that are also vertically manipulated by core rotation. The inclusion of a safety nut 172 ensures that any failure in the traveler 168, such as stripped threads, cracks, or cross-threading, results in minimal vertical displacement of the attached load 148 as the arm 170 will fall only into contact with the nut 172.

It is contemplated that the nut 172 is positioned in contact with the traveler 168 so that each component concurrently moves about the core 162 as a unitary assembly. However, such unitary configuration can result in inadvertent friction, heat, and stress that jeopardizes the performance, reliability, and safety of the core 162 and lifting column 160 as a whole. For instance, the combination of traveler 168 and nut 172 can place undue forces on a single thread or portion of the core 162 when heavy loads 148 (>10 tons) are vertically manipulated. Thus, a safety nut 172 is deliberately separated from the traveler 168 in some embodiments by a nut gap 174 to provide safety from traveler 168 failure without placing excessive force on the core 168, transmission 166, or downstream motor 142.

Although the mechanical configuration of the traveler 168 and nut 172 on the core 162 can be operated at will and manually inspected at any time, it is noted that operational defects and degraded performance may occur while the core 162 is rotating and the traveler/nut are moving, which is dangerous to manually inspect. Hence, one or more sensors 176 can be positioned inside, or outside, the housing 164 to monitor one or more operational characteristics of the lifting column 160 without any danger to a user.

Various embodiments can utilize any number of sensors 176 of one or more type to detect operational conditions associated with traveler 168 and nut 172 vertical manipulation. As a non-limiting example, acoustic, optical, mechanical, and environmental sensors can be placed throughout the housing 164 to measure the operating parameters associated with lifting, and lowering, such a temperature, humidity, moisture content, rotational speed, distance from the top of the core 162, distance to the bottom of the core 162, stress, tension, cracks, plastic deformation, and dimensions of one or more threads of the core 162.

With the nearly unlimited sensor 176 configuration possibilities for a lifting column 160, operation can be closely monitored and collected data can be used to alter core 162 operation. For example, core 162 rotation speed and/or scheduled service actions that can proactively, or reactively, altered to ensure safe, reliable, and consistent future lifting column 160 operation. It is noted that the ability to accurately and reliably measure assorted dimensions and distances within the housing 164 is critical to the ability to monitor current operational conditions as well as adjust operating parameters to optimize future operation.

One measurement that would optimize the sensing of lifting column 160 dimensions and operation is the nut gap distance 178 between the nut 172 and traveler 168. However, the typically small nut gap 174 (<1 inch) is difficult to accurately sense. That is, a small nut gap 174 distance, which may be 0.25 inches or less, creates difficulties in positioning a sensor 176 within, or proximal to, the nut gap 174 to accurately provide real-time operational measurements, particularly with the heat, stress, and presence of grease in the nut gap 174 during operation.

Figure 5A:
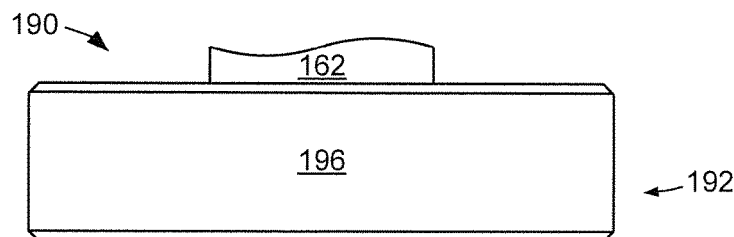
FIGS. 5A & 5B respectively depict portions of an example lifting column configured and operated in accordance with some embodiments.
Figure 5B:
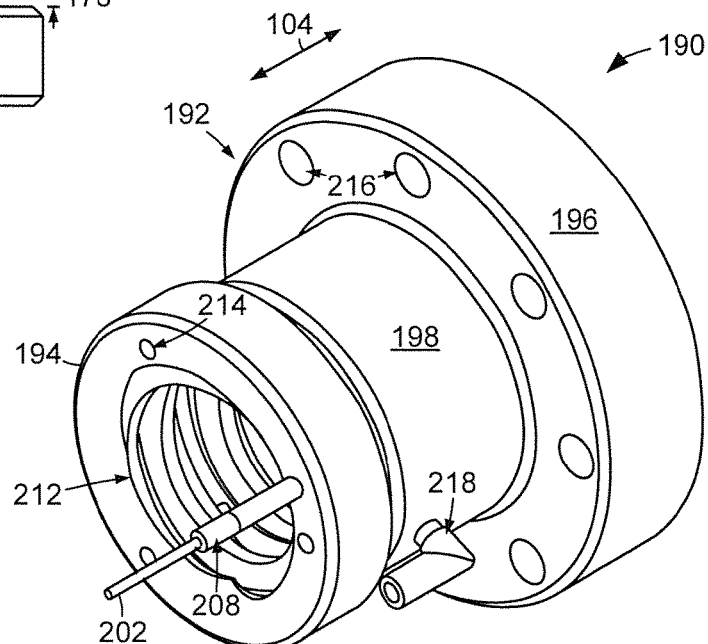

Accordingly, various embodiments are directed to a nut gap monitoring system that utilizes one or more sensors 176 to accurately measure the nut gap 174 during operation. FIGS. 5A & 5B respectively depict portions of an example lifting column 190 configured in accordance with some embodiments to provide optimized operation over time and despite the presence of operational degradation, errors, and/or failures detected by at least one nut gap system. The side view line representation of FIG. 5A illustrates how a traveler 192 is separated from a nut 194 on a rotating core 162 by a nut gap distance 178, such as 0.1-1 inch.

The traveler 192 can be constructed with a variety of different sizes, shapes, and materials that are conducive to cyclic physical loading of heavy loads. For instance, the traveler 192 may consist of a single material, such as steel, tungsten, polymer, or titanium, or may be a lamination of multiple different materials that can provide consistent strength and deformation characteristics despite extreme physical stress, heat, and vibration. Regardless the material composition, various embodiments configure the traveler 192 with a top body 196 that has a larger relative diameter to support an arm or platform and a bottom body 198 that has a smaller relative diameter.

With the nut gap 174 being small, a nut gap sensor 200 is arranged to extend through the nut 194 with at least a pin 202 that can physically contact a bottom surface 204 of the traveler 192 to allow a monitoring unit 206 determine the nut gap distance 178 between the traveler 192 and nut 194. The pin 202 can continuously extend within a conduit 208 that allows for smooth pin 202 movement and precise accuracy for unit 206 measurements. It is noted that the use of the pin 202 brings nut gap 174 measurements through the nut 194 and away from the nut gap 174 to a space that can accommodate the size and electrical connections of the monitoring unit 206.

While pin 202 movement can provide quick, accurate mechanical readings of the nut gap distance 178, some embodiments utilize non-mechanical types of sensors 176 in association with the conduit 208 that continuously extends through the nut 194. As a non-limiting example, the conduit 208 can be utilized for wires to connect the monitoring unit 206 to an optical or acoustic detector 210 positioned in, or immediately proximal to, the nut gap 174, which may or may not physically contact the bottom surface 204 of the traveler 192. It is contemplated that a mechanical sensor 200 utilizing a pin 202 can be employed in combination with another non-mechanical sensor extending through the nut 194 that utilizes a conduit 208 for electrical wiring instead of a moving pin 202.

FIG. 5B illustrates a perspective view line representation of the traveler 192 and nut 194 without the core 162 to show how threads 212 can be provided by the nut 194 to engage matching threads of a core 162. It is to be understood that the threads 212 present in the nut 194 can also be present throughout the portions of the traveler 192 that contact the core 162. The threads 212 of the nut 194 and traveler 192 may match in some aspects, such as thread pitch and thread depth, and may also be dissimilar, such as the addition of safety thread geometry in the nut 194 that is not present in the traveler 192.

The nut 194 may be free of any direct physical contact with the traveler 192, which coincides with a wider range of operational characteristics determining the nut gap distance 178. However, the nut 194 may alternatively be directly mounted to the traveler 192 via one or more fasteners extending through nut apertures 214 and into the traveler 192. The addition of direct fasteners, in addition to the conduit 208 that extends through the nut 194, can narrow the causes of nut gap distance 178 deviation and allow nut gap sensing to be more directly tied to thread degradation in the core 162 and traveler 192, which improves the ability to discern proactive and reactive actions that can optimize current and future lifting operations.

It is contemplated, but not required, that the traveler 192 is physically attached to an arm or platform. Such direct physical attachment can be facilitated with fasteners extending through traveler apertures 216 and into an arm/platform, as shown in FIG. 4. The operation of the traveler 192 to provide vertical manipulation of a load can be aided with grease or other lubricant, which can be pumped into the traveler 192 via one or more fittings 218 that provide lubrication to the physical interface between the core 162 and the threads and inner sidewalls of the traveler 192.

Figure 6:
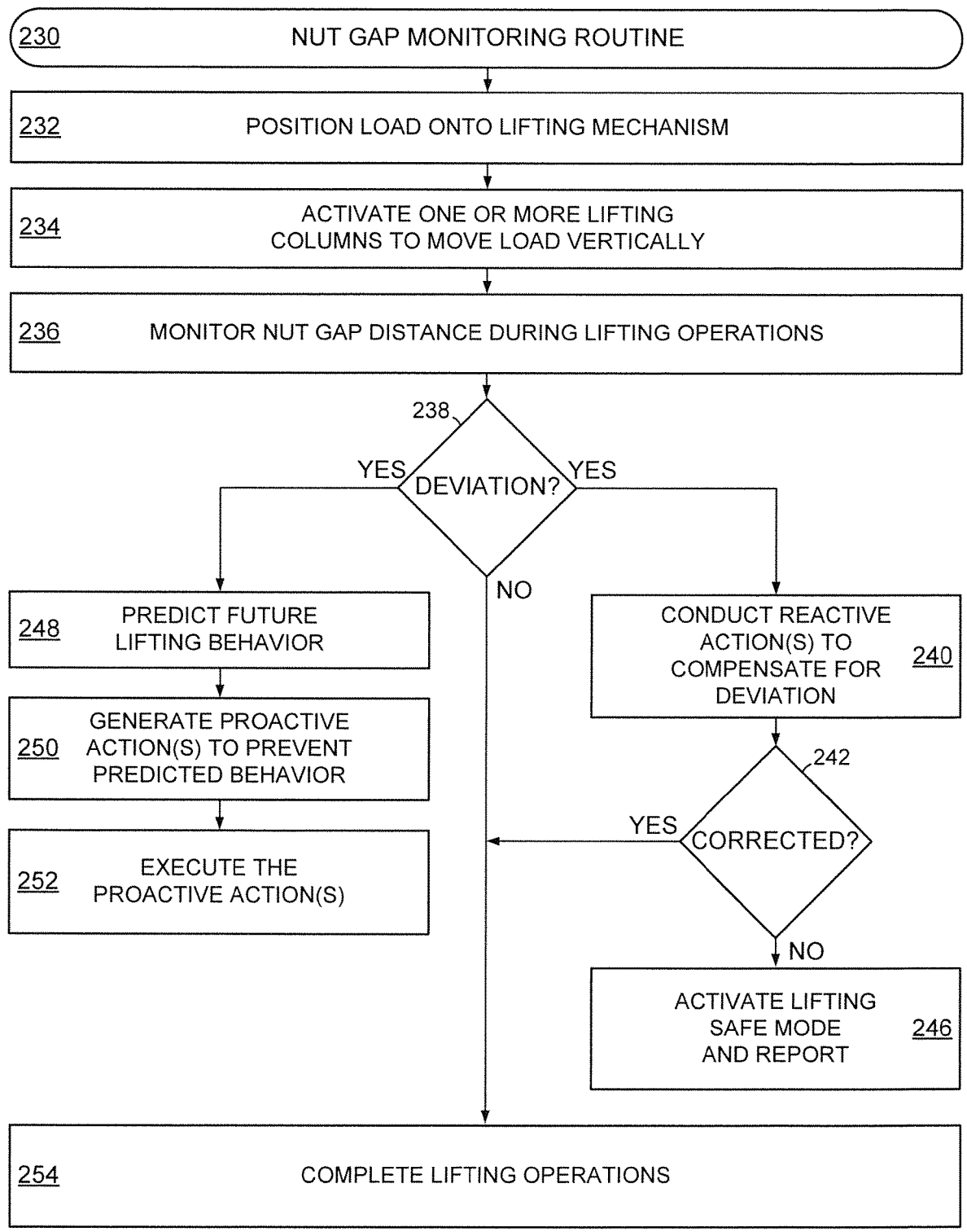
FIG. 6 is an example nut gap monitoring routine that may be executed with assorted embodiments of FIGS. 1-5B.

Through the accurate, real-time measurement of a nut gap 174 by one or more sensors 200, minute deviations in operation can be detected and correlated to the traveler or the core, which allows for reactive and proactive actions to be taken to modify the operational and/or structural parameters of a lifting column. An example nut gap monitoring routine 230 is displayed in FIG. 6 that can be carried out with the assorted embodiments of FIGS. 1-5B to provide optimal vertical manipulation of loads over time. The routine 230 can begin with one or more lifting columns being implemented in a machinery maintenance system that can at least vertically move a heavy load, such as 50 tons, with a lifting mechanism.

Step 232 positions a load onto arms, or a platform, supported by various lifting columns of a lifting mechanism. Some embodiments of step 232 provide a drop table where four lifting columns are physically connected via a base and a moving platform. Physical attachment of the load to the respective lifting columns allows step 234 to activate one or more motors/engines that power operation of the lifting columns as a collective unit. Step 234, in some embodiments, involves activating dual motors that each power two lifting columns in unison to lower, or raise, the attached load a selected distance.

During the lifting operations started in step 234, step 236 monitors the nut gap distance of at least one lifting column with at least one sensor that extends through a safety nut. Such sensor may consist of a pin, electrical wires, or optical cable extending from a monitoring unit to the nut gap where measurements are accurately taken and reported to a host in real-time. A host may be a user or programmable controller configured to log and react to nut gap distance measurements. The nut gap distance measuring in step 236 may be continuous, sporadic, or in scheduled intervals to convey if a deviation in nut gap distance is experienced.

Decision 238 can operate concurrently, or sequentially, with step 236 to determine if a nut gap deviation has occurred. If so, a host can conduct one or more reactive actions to compensate for the detected deviation in step 240. A reactive action may be to slow down lifting operations, speed up lifting operations, pump more grease into a traveler, reduce grease pressure into a traveler, or stopping lifting operations altogether.

Decision 242 then evaluates the effectiveness of the reactive action(s) by monitoring nut gap distance, perhaps with greater time resolution than in step 236. If the lifting operations have improved and no further nut gap deviation is experienced, the load is moved into a final position in step 244. However, if nut gap deviations remain or have newly occurred, step 246 proceeds to activate motor safe mode and report the maintenance system for service. Such safe mode may involve a deactivated motor, increased safety locks, or activation of a supplemental lifting mechanism to assist in moving the load to a desired height.

While lifting operations can reactively be optimized through the accurate measuring of a nut gap distance and generation of intelligent actions to correct, or mitigate, such deviations, the ability to proactively prevent deviations in nut gap distance provides a lifting column with long-term reliability and safety. The detection of actual nut gap deviations in decision 238 may also trigger a host to predict future lifting behavior in step 246 based on the detected nut gap deviations. For example, a temporary nut gap distance deviation at a particular location on a rotating core can be used to predict future greater deviations as degradation in core threads persist. As another non-limiting example, a continuous nut gap deviation can be used to predict traveler damage that will increase at a known rate, such as linear or exponential.

The prediction of one or more future lifting behaviors in step 246 enables step 248 to generate one or more proactive actions that can be conducted in the future to prevent at least one predicted behavior. For instance, grease can be scheduled to be removed from a lifting column core, a traveler can be physically reinforced, or certain portions of a core can be treated with greater, or lesser, core rotation and lifting operation speed. At a convenient time after step 248 generates the proactive action(s), such as when a load is not being supported, step 250 then executes one or more proactive actions generated from step 248.

Through the use of a nut gap monitoring sensor that can accurately detect nut gap distance in real-time, the operation of a lifting column can be understood and improved over time. The ability to identify reactive and proactive actions from nut gap measurements that can correct, or at least mitigate, current deviations in lifting column operations while preventing other lifting deviations ensures inevitable operational deviations do not jeopardize short-term or long-term safety, reliability, or efficiency.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a rotating core physically contacting a nut and a traveler, the nut and the traveler each being threaded on the rotating core and separated by a nut gap measured from a top surface of the nut to a bottom surface of the traveler, the top surface of the nut facing the bottom surface of the traveler, the nut gap monitored by a sensor continuously extending through the nut into the nut gap to continuously physically contact the bottom surface of the traveler during movement of the nut and the traveler.

2. The apparatus of claim 1, wherein the nut is a safety nut continuously extending around the rotating core.

3. The apparatus of claim 1, wherein the nut and the traveler are each threaded with a matching thread pitch.

4. The apparatus of claim 1, wherein the nut gap has a uniform distance throughout a circumference of the rotating core.

5. The apparatus of claim 1, wherein the nut gap is 0.25 inches.

6. The apparatus of claim 1, wherein the sensor comprises a pin continuously extending from the bottom surface of the traveler through the nut to a measuring unit.

7. The apparatus of claim 6, wherein the pin extends through a conduit positioned within an aperture of the nut.

8. The apparatus of claim 1, wherein the rotating core is positioned within a lifting housing.

9. The apparatus of claim 1, wherein the rotating core is connected to a transmission.

10. A lifting column comprising a rotating core physically contacting a nut and a traveler, the nut and the traveler each being threaded on the rotating core and separated by a nut gap measured from a top surface of the nut to a bottom surface of the traveler, the top surface facing the bottom surface, the nut gap monitored by a first sensor and a second sensor, each sensor continuously extending through the nut into the nut gap, the second sensor continuously physically contacting the bottom surface of the traveler during movement of the nut and the traveler.

11. The lifting column of claim 10, wherein the first sensor is a different type than the second sensor.

12. The lifting column of claim 10, wherein the first sensor and the second sensor are the same type of sensor.

13. The lifting column of claim 10, wherein the first sensor is an acoustic sensor.

14. The lifting column of claim 10, wherein the first sensor is a mechanical sensor.

15. The lifting column of claim 10, wherein the first sensor is an optical sensor.

16. The lifting column of claim 10, wherein the traveler is supplied with a lubricant via a fitting that is coupled to an interior cavity of the traveler where the rotating core contacts the traveler.

17. The lifting column of claim 10, wherein a platform contacts the traveler and extends away from the rotating core, the traveler configured to lift the platform and a load contacting the platform in response to rotation of the rotating core.

18. A method comprising:
positioning a traveler and a nut in physical contact with a rotating core, the nut traveler each being threaded on the rotating core and separated by a nut gap measured from a top surface of the nut to a bottom surface of the traveler, the top surface facing the bottom surface;
rotating the rotating core to vertically displace the traveler and the nut; and
measuring a nut gap distance with a sensor, the sensor continuously extending through the nut into the nut gap to access the nut gap and continuously physically contact the bottom surface of the traveler during movement of the nut and the traveler.

19. The method of claim 18, wherein a controller connected to the sensor generates a reactive action to correct an operational deviation detected by the sensor.

20. The method of claim 18, wherein a controller connected to the sensor generates a proactive action to prevent a future lifting behavior of the traveler predicted by the controller in response to the measured nut gap distance.

* * * * *